United States Patent [19]

Fuelling, Jr. et al.

[11] 4,307,563

[45] Dec. 29, 1981

[54] FILAMENT TRIMMER MOWER

[75] Inventors: William Fuelling, Jr., Galesburg; Carl E. Seyerle, Abingdon, both of Ill.

[73] Assignee: Outboard Marine Corporation, Waukegan, Ill.

[21] Appl. No.: 146,258

[22] Filed: May 5, 1980

[51] Int. Cl.³ .................... A01D 67/00; A01D 55/18; A01D 50/00
[52] U.S. Cl. ................................. 56/320.2; 56/12.7
[58] Field of Search ................... 56/12.7, 320.1, 320.2

[56] References Cited

U.S. PATENT DOCUMENTS

| 2,857,727 | 10/1958 | Cole | 56/320.2 |
|---|---|---|---|
| 3,029,582 | 4/1962 | Halleux | 56/320.2 |
| 3,144,258 | 8/1964 | Ottosen et al. | 56/320.2 |
| 4,033,098 | 7/1977 | Green | 56/17.5 |
| 4,077,191 | 3/1978 | Pittinger, Sr. | 56/12.7 |
| 4,112,653 | 9/1978 | Ballas et al. | 56/12.7 |
| 4,136,446 | 1/1979 | Tripp | 56/12.7 |
| 4,137,694 | 2/1979 | Hopper | 56/12.7 |
| 4,172,351 | 10/1979 | Scanland | 56/320.1 |
| 4,189,905 | 2/1980 | Frantello | 56/12.7 |
| 4,194,345 | 3/1980 | Pioch | 56/320.2 |
| 4,232,505 | 11/1980 | Walto | 56/12.7 |

FOREIGN PATENT DOCUMENTS 953114  8/1974  Canada ............................. 56/320.1

Primary Examiner—Paul J. Hirsch
Attorney, Agent, or Firm—Michael, Best & Friedrich

[57] ABSTRACT

Disclosed herein is a filament mower comprising a housing including a generally horizontal top deck and a depending wall extending downwardly from the top deck and including an arcuate portion and a side wall portion, which arcuate portion has a generally common radius extending from a common center, and which side wall portion is radially spaced from the common center at a distance less than the common radius. The mower also includes a filament head carried by the housing for rotation within the housing, wheel means on the housing for supporting the housing for travel on the ground, and a handle connected to the housing.

11 Claims, 6 Drawing Figures

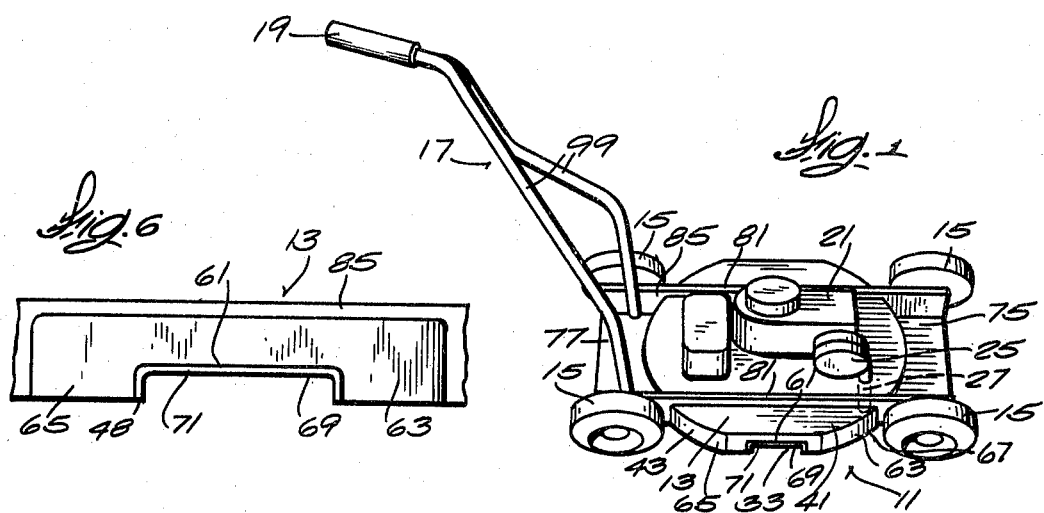
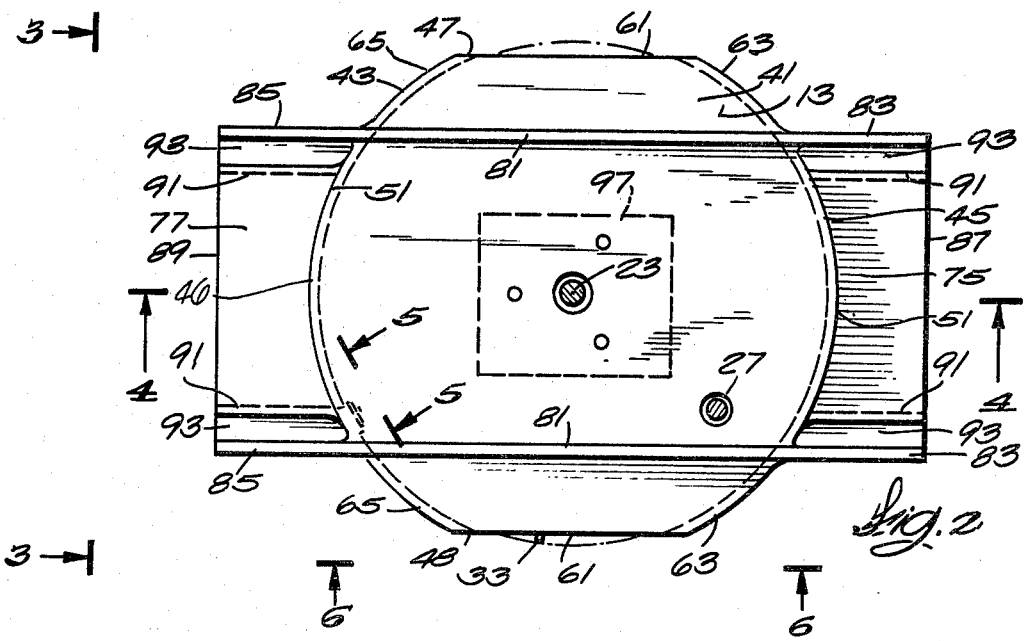
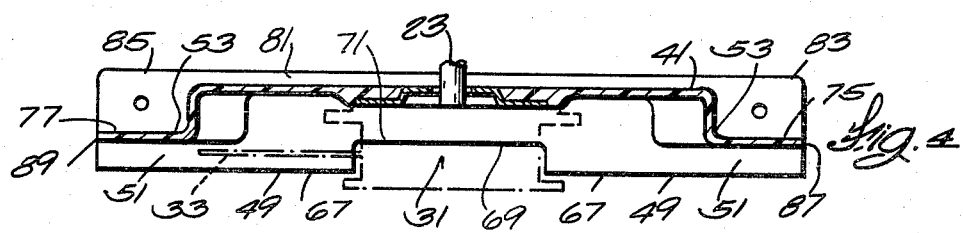
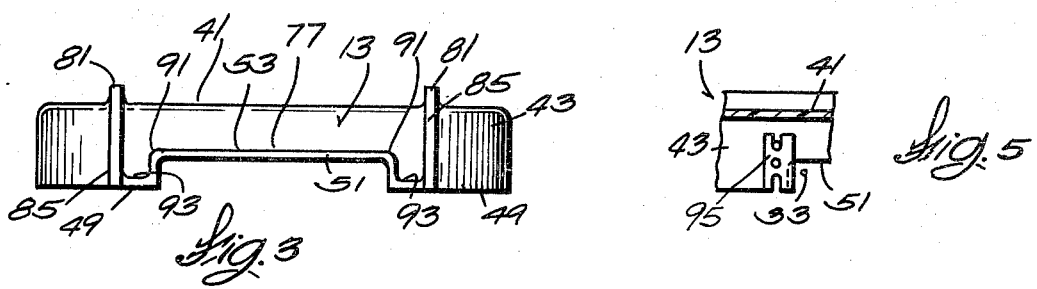

FILAMENT TRIMMER MOWER

BACKGROUND OF THE INVENTION

The invention relates to filament string cutting of grass and other vegetation and, more particularly, to filament string mowers.

One example of a prior filament string cutter supported on a wheel is disclosed in Green U.S. Pat. No. 4,033,098 issued July 5, 1977.

One example of a prior filament string mower is disclosed in the Pittinger U.S. Pat. No. 4,077,191 issued Mar. 7, 1978.

Another wheel supported filament cutter is disclosed in the Hooper U.S. Pat. No. 4,137,694 issued Feb. 6, 1979.

SUMMARY OF THE INVENTION

The invention provides a filament mower comprising a housing including a generally horizontal top deck and a depending wall extending downwardly from the top deck and including an arcuate portion and a side wall portion, which arcuate portion has a radius extending from a center, and which side wall portion is radially spaced from the center at a distance less than the radius the mower also includes a filament head carried by the housing for rotation within the housing, wheel means on the housing for supporting the housing for travel on the ground, and a handle connected to the housing.

In one embodiment of the invention, the side wall is straight and generally parallel to the direction of intended movement of the mower.

In one embodiment of the invention, the side wall portion includes a lower edge with an upwardly extending cutout part having an upper edge, and the mower further includes a filament string carried by the head for rotation therewith in a plane between the upper and lower edges, which string has, when the head is rotatably driven, an effective radial length less than the radius and greater than the radial spacing of the side wall portion.

THE DRAWINGS

FIG. 1 is a perspective view of a filament mower embodying various of the features of the invention.

FIG. 2 is an enlarged plan view (with parts omitted) of the mower shown in FIG. 1.

FIG. 3 is an end view taken along line 3—3 of FIG. 2.

FIG. 4 is a sectional view taken along line 4—4 of FIG. 2.

FIG. 5 is a fragmentary view taken along line 5—5 of FIG. 2.

FIG. 6 is a fragmentary view taken along line 5—5 of FIG. 2.

Before explaining at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology herein is for the purpose of description and should not be regarded as limiting.

GENERAL DESCRIPTION

Shown in the drawings is one embodiment of a filament mower 11 comprising a housing 13 which is supported for travel over the ground by a plurality of wheels 15 and which is guided for movement over the ground by a handle 17 which is fixed to the housing 13, which extends upwardly and rearwardly from the housing 13, and which preferably includes a single, rearwardly extending hand grip 19.

Also forming part of the mower 11 is a prime mover which can be an electric motor and which, in the illustrated construction, is an internal combustion engine 21 which is mounted on the housing 13 and which includes an output shaft 23 extending through a central opening in the housing 13. Preferably, the engine includes a muffler 25 having an exhaust outlet 27 arranged to pass through the housing 13 and to discharge exhaust gases into the area beneath and within the housing 13. In addition, the mower 11 includes (see FIG. 4), a filament head 31 which is mounted on the output shaft 23 for common rotation therewith and which includes a flexible filament string 33. The filament string 33 is rotated by the head 31 in a generally horizontal plane, and means (not shown) are provided for withdrawing selected lengths of string 33 from the head 31. Any suitable head construction can be employed.

Referring to the housing in greater detail, the housing 13 is preferably molded of plastic and includes a top deck or wall 41, together with a depending wall 43 which includes a front portion 45, a rear portion 46 and side wall portions 47 and 48. The front and rear wall portions 45 and 46 of the depending wall 43 extend generally arcuately at a common radius from a common center concentric with the engine output shaft 23. The front and rear wall portions 45 and 46 respectively includes lower or bottom edges 49 which are located below the plane of rotation of the trimmer string 33 and which include respective cutouts or notches 51 having upper edges 53 located above the plane of trimmer string rotation, whereby to facilitate entry into the housing 13 of grass from either the front or rear.

The side wall portions 47 and 48 of the depending wall 43 respectively include central parts 61, together with front and rear parts 63 and 65 which can be regarded as arcuate extensions of the front and rear wall portions 45 and 46. The side wall portions 47 and 48 also respectively include lower or bottom edges 67 located below the plane of rotation of the trimmer string 33 (and generally co-planar with the front and rear wall portion lower edges 49), together with upwardly extending cutouts or notches 69 which are located in the central parts 61 of the side wall portions 47 and 48 and which include upper edges 71 located above the plane of rotation of the trimmer string 33. Preferably, the side wall central parts 61 including the cutouts or notches 69, extend linearly in parallel relation to the direction of intended mower travel and are spaced from the common center at a distance less than the radious of the front and rear side wall parts 63 and 65 (which radius is common to the radius of the front and rear wall portions 45 and 46). With this construction, the outer end of the trimmer string 33 will, during rotation, be effectively inwardly spaced from the depending wall 43 except at the central parts 61 of the side wall portions 47 and 48 whereat the outer end of the trimmer string 33 will effectively extend outwardly from the housing 13 for cutting of grass, etc., as shown at the bottom of FIG. 2.

The housing 13 also preferably includes front and rear top deck extensions 75 and 77 which respectively project generally horizontally and forwardly from the upper edges 53 of the front and rear wall cutouts or notches 69.

In order to provide additional rigidification, the housing 13 is provided with a pair of laterally spaced reinforcing ribs 81 which extend, one to either side of the center, in the direction of intended mower travel. The ribs 81 are raised above the top deck 41 and include front and rear extensions 83 and 85 which respectively project to the front and rearward edges 87 and 89, respectively, of the front and rearward top deck extensions 75 and 77. In addition, the ribs 81 are located adjacent to and merge through an upwardly open U shape part 93 (see FIG. 3) with the laterally spaced sides 91 of the forward and rearward top deck extensions 83 and 85.

The before mentioned wheels 15 comprise four wheels which are preferably height adjustably mounted on the rib extensions 83 and 85.

In order to limit the effective length of the trimmer string 33 from the head 31, the housing 13 is interiorly provided (see FIG. 5) on the depending wall 43, with means supporting a cutting blade, such as a razor blade 95, located in position to cut excessive lengths of the trimmer string 33 during rotation thereof.

In order to provide a solid base for the prime mover, a metalic reinforcing plate 97 (see FIG. 2) is preferably molded into the housing 13 at the center of the top deck 41.

The handle 17 can have either a single leg or, as illustrated, a pair of legs 99 which are suitably connected to the housing 13 and preferably to the inside of the rear rib extensions 85. Preferably, the handle 17 extends upwardly and rearwardly and terminates in the single hand grip 19 which can be provided with controls for the motor or engine 21 and/or for operating the head 31 to regulate playing out from the head 31 of trimmer string 33.

The employment of the cutouts or notches 51 in the front and rear wall portions 45 and 46 affords ease of travel over the ground by facilitating passage of grass into and from the housing 13. In addition, the straight central parts 61 including the side wall cutouts or notches 69 permit travel or trimmer string 33 outwardly of the housing 13 in a limited area for side cutting in close areas.

The single hand grip handle 17 provides a wand-type action for guidance of the mower 11 during travel over the ground.

Various of the features of the invention are set forth in the following claims.

We claim:

1. A filament mower comprising a housing including a generally horizontal top deck and a depending wall extending downwardly from said top deck and including an arcuate portion having a radius extending from a center, and a side wall portion extending generally parallel to the direction of intended movement of said mower and being radially spaced from said center at a distance less than said radius, said side wall portion including a lower edge with an upwardly extending cutout part having an upper edge, a filament head carried by said housing for rotation within said housing, a filament string carried by said head for rotation therewith in a plane located centrally between said upper and lower edges, said string having, when said head is rotatably driven, an effective radial length less than said radius and greater than said radial spacing of said side wall portion, wheel means on said housing for supporting said housing for travel on the ground, and a handle connected to said housing.

2. A filament mower in accordance with claim 1 wherein said handle extends upwardly and rearwardly from said housing and includes a single hand grip extending in the fore and aft direction.

3. A filament mower in accordance with claim 1 wherein said housing is primarily fabricated of plastic.

4. A filament mower comprising a housing including a generally horizontal top deck and a depending wall extending downwardly from said top deck and including front, rear, and side wall portions, said front and rear wall portions being arcuate and having a generally common radius extending from a common center, each of said front and rear wall portions having a lower edge having an upwardly extending cutout part, each of said side wall portions being spaced from said common center at a distance less than said common radius and having a lower edge with an upwardly extending cutout part, a prime mover mounted on the said top deck and including an output shaft extending through said top deck, a filament head carried by said output shaft for rotation within said housing, wheel means on said housing for supporting said housing for travel on the ground, and a handle connected to said housing.

5. A filament mower in accordance with claim 4 where said handle extends upwardly and rearwardly from said housing and includes a single hand grip extending in the fore and aft direction.

6. A filament mower in accordance with claim 4 wherein said housing is primarily fabricated of plastic.

7. A filament mower in accordance with claim 4 wherein said front wall cutout part includes an upper edge and wherein said housing includes a front extension which projects horizontally forwardly from said upper edge of said front wall cutout part.

8. A filament mower in accordance with claim 4 wherein said rear wall cutout part includes an upper edge and wherein said housing includes a rear extension which projects horizontally and rearwardly from said upper edge of said rear wall cutout part.

9. A filament mower in accordance with claim 4 wherein said front and rear wall cutout parts each include an upper edge, wherein said housing includes front and rear extensions which respectively project horizontally forwardly from said upper edges of said front and rear wall cutout parts, said extensions each having outer edges and laterally spaced sides, wherein said housing includes a pair of laterally spaced reinforcing ribs which are raised above said top deck, which include front and rear extensions respectively extending forwardly and rearwardly to said outer edges of said front and rear extensions and which are located in adjacently outwardly spaced relationship from said sides of said front and rear extensions, and wherein said wheel means are mounted on said front and rear extensions of said ribs.

10. A filament mower in accordance with claim 4 wherein said side walls are straight and generally parallel to the direction of intended movement of said mower.

11. A filament mower in accordance with claim 4 wherein said filament head includes a filament adjustably extending from said head and wherein said housing includes cutting means positioned to limit the effective length of said filament.

* * * * *